(12) United States Patent
Cocchi et al.

(10) Patent No.: US 10,602,755 B2
(45) Date of Patent: Mar. 31, 2020

(54) MACHINE AND METHOD FOR MAKING LIQUID OR SEMI-LIQUID PRODUCTS

(71) Applicant: ALI GROUP S.r.l. - CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L. - CARPIGIANI, Cernusco Sul (IT)

( * ) Notice: Subject to any disclaimer, the term of this patent is extended or adjusted under 35 U.S.C. 154(b) by 81 days.

(21) Appl. No.: 15/483,391

(22) Filed: Apr. 10, 2017

(65) Prior Publication Data
US 2017/0295819 A1   Oct. 19, 2017

(30) Foreign Application Priority Data

Apr. 13, 2016   (IT) .......................... 102016000038233

(51) Int. Cl.
    *A23G 9/28*   (2006.01)
    *A23G 9/22*   (2006.01)
    *A23G 9/46*   (2006.01)

(52) U.S. Cl.
    CPC ............... *A23G 9/28* (2013.01); *A23G 9/22* (2013.01); *A23G 9/46* (2013.01)

(58) Field of Classification Search
    CPC ... A23G 9/28; A23G 9/04; A23G 9/08; A23G 9/12; A23G 9/16; A23G 9/20; A23G 9/22;
    (Continued)

(56) References Cited

U.S. PATENT DOCUMENTS 3,019,615 A * 2/1962 Moser ...................... A23G 9/20
                                                        137/398
4,201,558 A * 5/1980 Schwitters ............. A23G 9/045
                                                        137/594
(Continued)

FOREIGN PATENT DOCUMENTS

CN          1250424 A     4/2000
CN          1612996 A     5/2005
(Continued)

OTHER PUBLICATIONS

European Search Report dated Jun. 9, 2017 from counterpart European App No. 17165526.9.
(Continued)

*Primary Examiner* — Melvin Jones
(74) *Attorney, Agent, or Firm* — Shuttleworth & Ingersoll, PLC; Timothy J. Klima

(57) ABSTRACT

A machine for making liquid or semi-liquid products comprises: a first container adapted to contain a first liquid or semi-liquid basic product; a first stirrer, mounted inside the first container; a second container connected to the first container to receive therefrom the first liquid or semi-liquid basic product; a pipe connecting the first container to the second container; a second stirrer, mounted inside the second container; a pump, having a first inlet duct, connected to the first container in order to draw the first liquid or semi-liquid basic product, a second, air inlet duct, and an outlet connected to the connecting pipe, the pump being also configured to mix the first liquid or semi-liquid basic product with air by compression.

11 Claims, 4 Drawing Sheets

(58) Field of Classification Search
CPC .......... A23G 9/222; A23G 9/224; A23G 9/30;
A23G 9/305; A23G 9/46; A23G 1/56;
F28F 7/0075; F28F 7/024; G07F 17/007;
Y10T 137/86734; Y10T 137/8766
See application file for complete search history.

(56) References Cited

U.S. PATENT DOCUMENTS

| | | | |
|---|---|---|---|
| 4,412,428 A | 11/1983 | Giannella et al. | |
| 5,072,599 A | 12/1991 | Simone | |
| 5,405,054 A * | 4/1995 | Thomas | A23G 3/28 |
| | | | 222/105 |
| 5,706,720 A * | 1/1998 | Goch | A23G 9/20 |
| | | | 366/149 |
| 5,727,713 A * | 3/1998 | Kateman | A23G 9/04 |
| | | | 222/145.6 |
| 5,775,533 A * | 7/1998 | Schroeder | A23G 9/285 |
| | | | 222/105 |
| 5,797,519 A | 8/1998 | Schroeder et al. | |
| 6,010,035 A * | 1/2000 | Estruch | A23G 9/045 |
| | | | 222/142 |
| 6,637,214 B1 * | 10/2003 | Leitzke | A23G 9/163 |
| | | | 62/342 |
| 9,011,954 B2 * | 4/2015 | Dyks | A23G 3/0236 |
| | | | 426/512 |
| 9,095,154 B2 * | 8/2015 | Anliker | A47J 31/402 |
| 9,335,082 B2 * | 5/2016 | Gist | A23G 9/045 |
| 2002/0043071 A1 * | 4/2002 | Frank | A23G 9/045 |
| | | | 62/135 |
| 2005/0198990 A1 | 9/2005 | Kateman et al. | |
| 2007/0272317 A1 | 11/2007 | Klopfenstein et al. | |
| 2009/0323462 A1 * | 12/2009 | Cocchi | A23G 9/12 |
| | | | 366/147 |
| 2012/0044781 A1 * | 2/2012 | Bravo | A21C 1/06 |
| | | | 366/144 |
| 2015/0096322 A1 | 4/2015 | Cocchi et al. | |
| 2015/0246804 A1 | 9/2015 | Fracassi et al. | |
| 2015/0296820 A1 * | 10/2015 | Cocchi | A23G 9/363 |
| | | | 426/43 |

FOREIGN PATENT DOCUMENTS

| | | |
|---|---|---|
| CN | 1984837 A | 6/2007 |
| EP | 2783574 A1 | 10/2014 |
| GB | 875608 A | 8/1961 |

OTHER PUBLICATIONS

Office Action issued by the Chinese Patent Office dated Aug. 22, 2019 for counterpart Chinese Patent Application No. 201710231923.1.

Italian Search Report dated Nov. 17, 2016 from counterpart Italian App No. IT UA20162572.

* cited by examiner

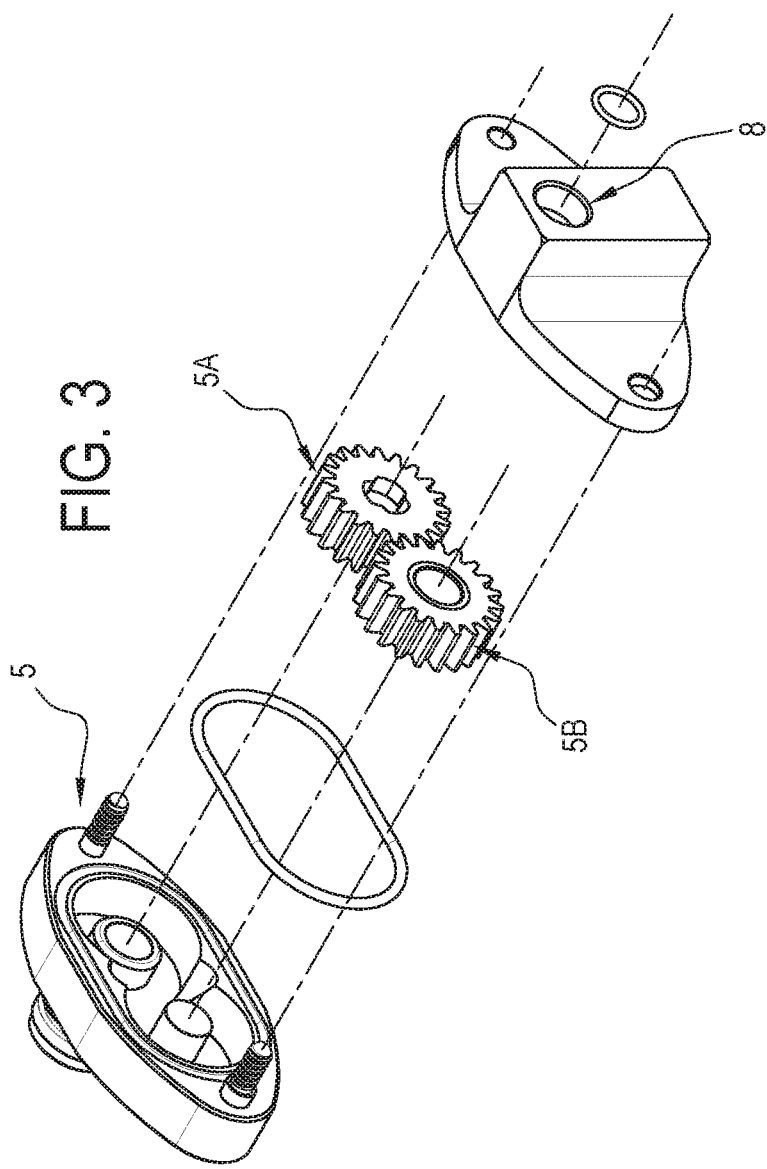
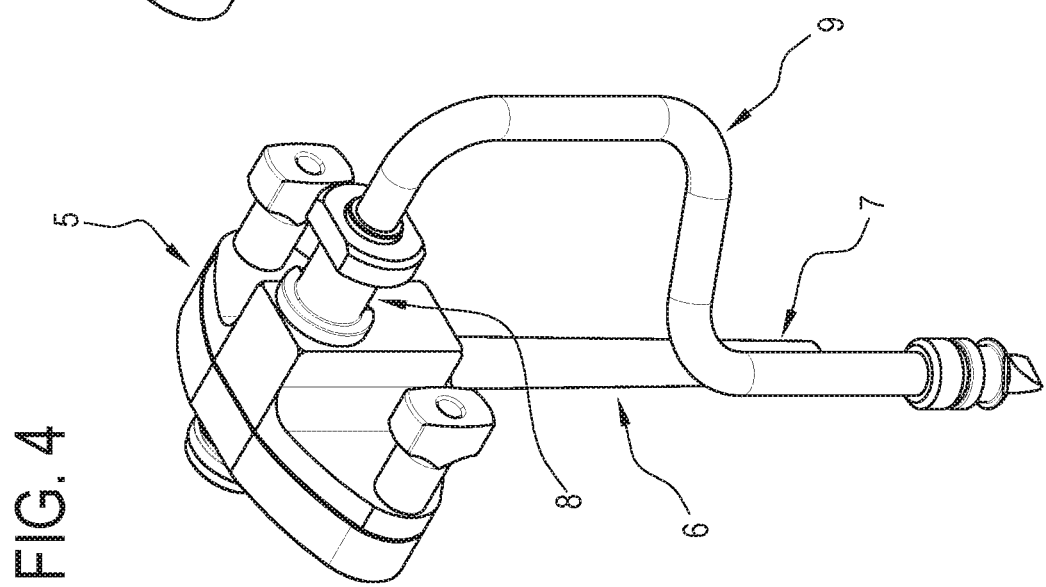

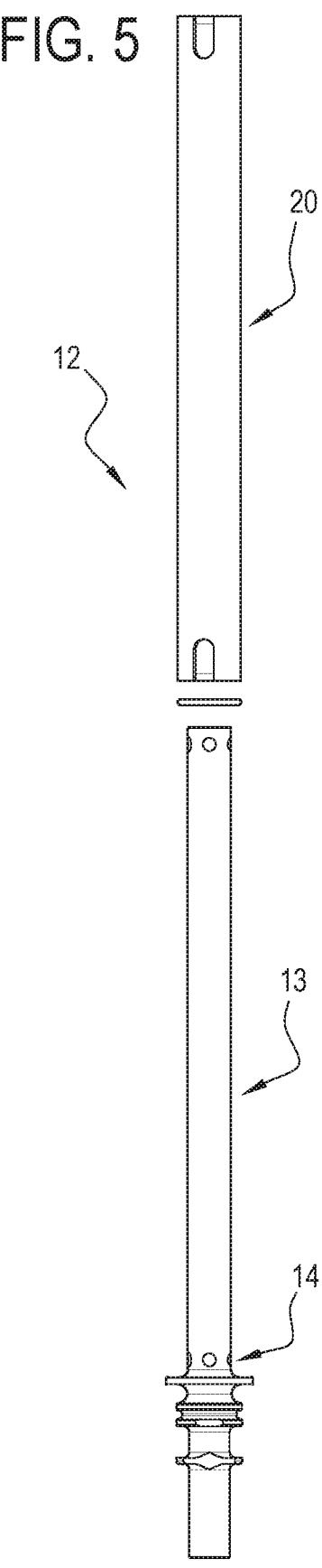
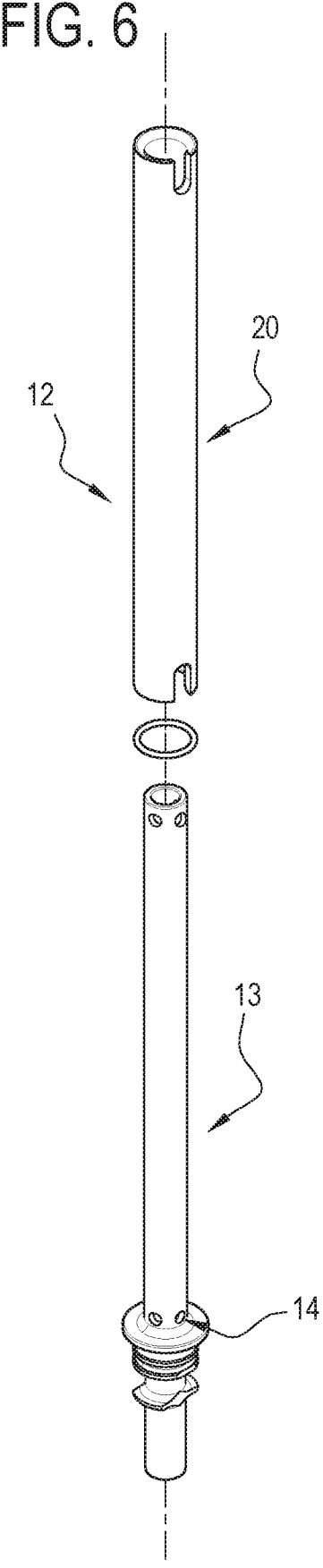
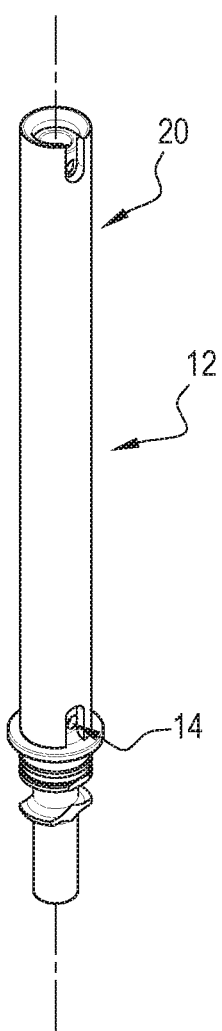

MACHINE AND METHOD FOR MAKING LIQUID OR SEMI-LIQUID PRODUCTS

This application claims priority to Italian Patent Application No. 102016000038233 filed Apr. 13, 2016, the entirety of which is incorporated by reference herein.

BACKGROUND OF THE INVENTION

This invention relates to a machine and a method for making and dispensing products generically defined as liquid or semi-liquid products.

A need which is felt particularly strongly in the ice cream trade is that for a compact machine capable of making, even simultaneously, ice cream type products (where the basic mixture normally increases in volume during processing) and products whose volume before and after processing remains the same (for example, fruit based products or yogurts).

SUMMARY OF THE INVENTION

This invention has for an aim to provide a machine and a method for making liquid or semi-liquid products to meet the above mentioned need in a particularly simple manner.

Yet another aim of this invention is to provide a machine and a method for making liquid or semi-liquid products and capable of making product of two different kinds simultaneously.

BRIEF DESCRIPTION OF THE DRAWINGS

This and other innovative features of the invention, together with its advantages, will become more apparent from the following description of a preferred embodiment of it, illustrated by way of non-limiting example in the accompanying drawings, in which:

FIGS. 3 and 4 are perspective views of a detail of the machine of FIGS. 1 and 2;

FIGS. 5 to 7 are perspective views of another detail of the machine of FIGS. 1 and 2.

DESCRIPTION OF THE PREFERRED EMBODIMENTS

Figure 1:
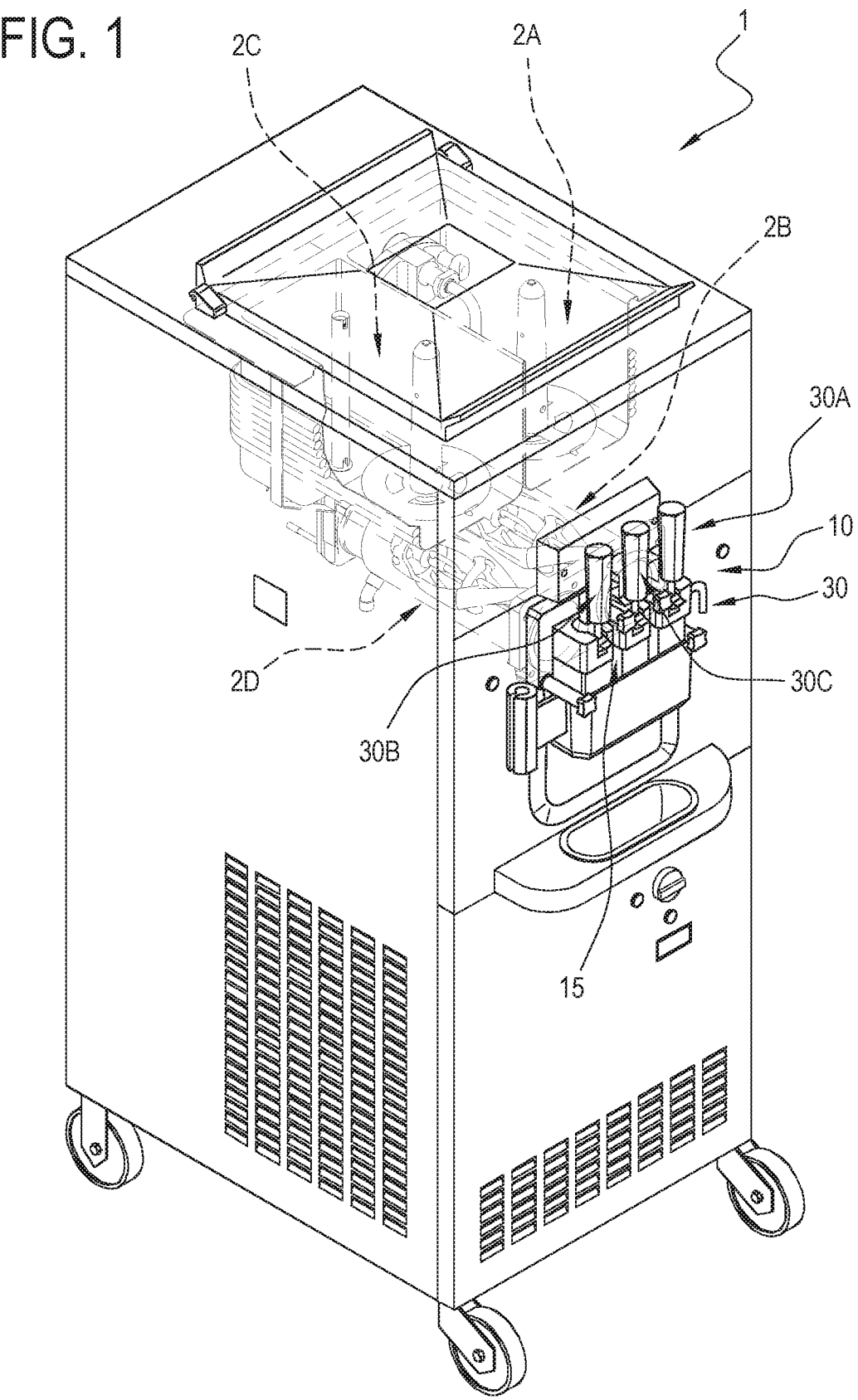
FIG. 1 shows a machine for making liquid or semi-liquid products according to the invention.
Figure 2:
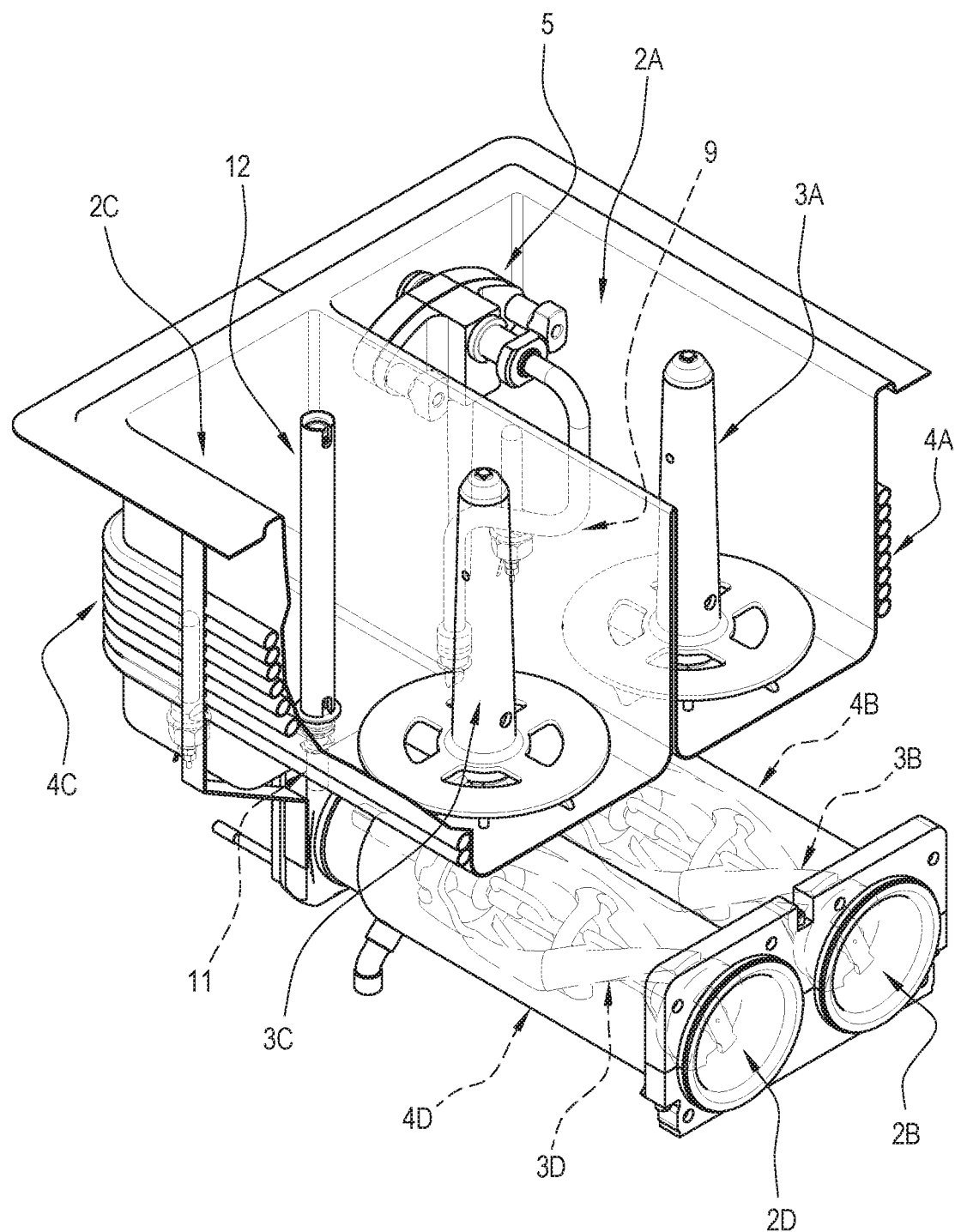
FIG. 2 shows a detail from FIG. 1.

As shown in FIG. 1 and following figures, the numeral 1 denotes a machine for making liquid or semi-liquid products (preferably ice cream type products).

Defined according to the invention is a machine 1 for making liquid or semi-liquid (in particular, for making, even simultaneously, products of two different kinds, a first liquid or semi-liquid product and a second liquid or semi-liquid product), comprising:

a first container 2A adapted to contain a first liquid or semi-liquid basic product;

a first stirrer 3A, mounted inside the first container 2A;

a second container 2B connected to the first container 2A to receive therefrom the first liquid or semi-liquid basic product;

a pipe 9 connecting the first container 2A to the second container 2B;

a second stirrer 3B, mounted inside the second container 2B;

first thermal treatment means 4A, associated with the first container 2A to heat and/or cool the walls of the first container 2A;

second thermal treatment means 4B, associated with the second container 2B to heat and/or cool the walls of the second container 2B in such a way as to make a first liquid or semi-liquid product (preferably, a first liquid or semi-liquid product with high overrun);

a pump 5, having a first inlet duct 6, connected to the first container 2A in order to draw the first liquid or semi-liquid basic product, a second, air inlet duct 7, and an outlet 8 connected to the connecting pipe 9, the pump 5 being also configured to mix the first liquid or semi-liquid basic product with air by compression;

a first dispensing device 10, connected to the second container 2B to allow delivering (to the outside of the machine) the first liquid or semi-liquid product contained in the second container 2B;

a third container 2C adapted to contain a second liquid or semi-liquid basic product;

a fourth container 2D connected to the third container 2C to receive therefrom the second liquid or semi-liquid basic product;

a pipe 11 connecting the third container 2C to the fourth container 2D;

third thermal treatment means 4C, associated with the third container 2C to heat and/or cool the walls of the third container 2C;

fourth thermal treatment means 4D, associated with the fourth container 2D to cool the walls of the fourth container 2D;

a suction device 12 for taking in the second liquid product and mixing it with air, comprising a tubular element 13 provided with at least one lower opening 14 for receiving the second liquid or semi-liquid basic product and at least one upper opening 14 for receiving air, located in the third container 2C and connected, in use, to the connecting pipe 11 between the third container 2C and the fourth container 2D, configured to allow mixing together the second liquid or semi-liquid basic product and air;

a second dispensing device 15, connected to the fourth container 2D to allow delivering (to the outside of the machine) the second liquid or semi-liquid product contained in the fourth container 2D.

It should be noted that the first, second, third and fourth thermal treatment means (4A; 4B; 4C;4D) preferably comprise a heat exchanger.

Preferably, the heat exchange means also comprise a circuit containing a heat exchanger fluid and a thermodynamic system configured to release/absorb heat to/from the heat exchangers.

It should be noted that the circuit may be the same and that the exchangers forming part of the first, second, third and fourth thermal treatment means (4A; 4B; 4C;4D) may be associated with different parts of the circuit.

It should also be noted that the circuit may comprise one or more branches which may be opened or closed to modify the configuration of the system with regard to the releasing or absorption of heat at one or more of the exchangers forming part of the first, second, third and fourth thermal treatment means (4A; 4B; 4C;4D).

According to another aspect, the first container 2A and the third container 2C are defined by respective tanks which are openable at the top.

According to another aspect, the second container 2B and the fourth container 2D are cylindrical containers.

It should be noted that according to this aspect, the second and fourth thermal treatment means are configured to absorb heat from the walls of the second container 2B and of the fourth container 2D, respectively: that means the product being processed inside the second and fourth containers 2B and 2D is subjected to cooling.

It should be noted that normally, in use, when the second and fourth thermal treatment means are operating in cooling mode, the second and fourth stirrers (3B;3D) are also on.

According to another aspect, the pump 5 is a gear pump.

More preferably, the pump 5 comprises a first gear 5A and a second gear 5B acting in conjunction with each other.

The gears (5A;5B) are configured to rotate about two distinct pivot points.

The gears (5A;5B) are configured to rotate about two distinct pivot points in opposite directions.

It should be noted that these gears are each defined by a circular element provided with a toothed periphery.

The compression of the liquid or semi-liquid basic product occurs in a zone where the teeth of the gears (5A;5B) are meshed together.

It should be noted that the pump 5 is configured to compress the first liquid or semi-liquid product and to mix it with air; more specifically, the pump compresses the liquid outflow to up to approximately 3 bar.

It should be noted that the pump substantially compresses the first basic liquid or semi-liquid product more than the suction device 12.

In effect, the suction device 12 transfers the second liquid basic product from the third container 2C to the fourth container 2D mainly by gravity and/or by the suction effect created by the rotation of the fourth stirrer 3D.

Thus, increasing the compression of the first liquid or semi-liquid product during transfer from the first container 2A to the second container 2B by means of the pump 5 has the effect of producing a liquid or semi-liquid product with a high overrun during processing inside the second container 2B.

As is known, overrun measures the percentage of air incorporated into the finished product and is defined and measured as follows:

(weight of basic mixture−weight of finished product)*100.

Thus, the machine 1 allows processing in the first and second containers a liquid or semi-liquid product with a high overrun such as, for example, artisan gelato, soft ice cream, sorbets, etc.

It should be noted that pasteurization, that is, heating to a temperature between 60 and 85° C., is carried out in the first container 2A for a predetermined length of time (normally less than 45 minutes).

Next, the first liquid or semi-liquid product in the first container 2A is held at a temperature between 0° C. and 6° C., more preferably between 3° C. and 5° C. (this step is called "ageing").

With reference, on the other hand, to processing in the third container 2C and fourth container 2D, it should be noticed that such processing allows obtaining a product with less overrun than that obtainable in the first and second containers (2A;2B).

In effect, as already stated, the suction device 12 cannot pressurize the liquid or semi-liquid basic product (to the same extent as the pump 5).

Thus, the liquid or semi-liquid product processed in the third container 2C and in the fourth container 2D, such as fruit-based products or yogurt, for example, has less overrun than the first liquid or semi-liquid product.

Advantageously, the first and second products may be processed at the same time.

Thus, it should be noted that the machine 1 advantageously allows products of two different kinds—a product with high overrun and a product with low overrun—to be processed simultaneously.

The machine 1 thus allows shopkeepers to save on costs and to optimize shop floor space.

As regards the suction device 12, it should be noted that this device also comprises a second tubular element 20 which is keyed (slidably coupled) to the tubular element 13 (that is, positioned in contact with the outside wall of the tubular element 13).

It should be noted that the second tubular element 20 is internally hollow so that it can be coupled to the tubular element 13.

At the bottom of it, the tubular element 13 comprises a flange for abutting against the second tubular element 20.

The position of the second tubular element 20 relative to the first tubular element 13 can be adjusted to allow regulating the outflow area of the lower receiving opening 14 (thereby adjusting the ratio between air and the second liquid base product transferred to the fourth container 2D).

In other words, the inside wall of the second tubular element 20 occludes a part of the lower opening 14 as a function of the position of the second tubular element 20 relative to the tubular element 13.

It should be noted that the machine 1 preferably comprises a dispensing device 30 provided with three controls: a first control 30A (or lever) can be operated to dispense the product from the second container 2B, a second control 30B can be operated to dispense the product from the fourth container 2D, and a third control 30C can be operated to dispense a product mixture from the second container 2B and from the fourth container 2D.

Also defined according to the invention is a method for making a first liquid or semi-liquid ice cream type product and a second liquid or semi-liquid yogurt type product, comprising the following steps:

preparing a machine 1 according to any of the features described in the foregoing;

preparing a first liquid basic product inside the first container 2A;

subjecting the first liquid basic product to stirring and thermal treatment simultaneously inside the first container 2A;

drawing the first liquid basic product by means of the pump 5 and mixing it with air;

increasing the pressure of the first liquid basic product by means of the pump 5 and transferring it into the second container 2B;

mixing the first liquid product in the second container 2B and subjecting it to thermal treatment to make an ice cream type finished product;

preparing a second liquid basic product inside the third container 2C;

subjecting the second liquid basic product to stirring and thermal treatment simultaneously inside the third container 2C;

transferring the second liquid basic product by means of the suction device 12 from the third container 2C to the fourth container 2D and simultaneously mixing it with air;

mixing the second liquid product in the fourth container 2D and subjecting it to thermal treatment to make a yogurt type finished product.

According to another aspect, the step of transferring the second liquid basic product by means of the suction device 12 from the third container 2C to the fourth container 2D and simultaneously mixing it with air comprises a step of adjusting the outflow cross section area of the lower receiving opening 14 of the second liquid or semi-liquid basic product in order to adjust and thereby set the ratio between the air and the second liquid basic product inside the tubular element 13.

According to another aspect, the steps of: mixing the second liquid product in the fourth container 2D and subjecting it to thermal treatment to make a yogurt type finished product; and mixing the first liquid product in the second container 2B and subjecting it to thermal treatment to make an ice cream type finished product, are carried out substantially simultaneously.

What is claimed is:

1. A machine for making liquid or semi-liquid products comprising:
   a first container adapted to contain a first liquid or semi-liquid basic product;
   a first stirrer, mounted inside the first container;
   a second container connected to the first container to receive from the first container the first liquid or semi-liquid basic product;
   a first connecting pipe connecting the first container to the second container;
   a second stirrer, mounted inside the second container;
   a first thermal treatment system including a first heat exchanger operatively connected with the first container to heat and/or cool the walls of the first container;
   a second thermal treatment system including a second heat exchanger operatively connected with the second container to heat and/or cool the walls of the second container in such a way as to make a first liquid or semi-liquid product;
   a pump, including a first inlet duct, connected to the first container in order to draw the first liquid or semi-liquid basic product, a second, air inlet duct, and an outlet connected to the first connecting pipe, the pump being also configured to mix the first liquid or semi-liquid basic product with air by compression;
   a first dispensing device, connected to the second container to allow releasing the first liquid or semi-liquid product contained in the second container;
   a third container adapted to contain a second liquid or semi-liquid basic product;
   a fourth container connected to the third container to receive therefrom the second liquid or semi-liquid basic product;
   a second connecting pipe connecting the third container to the fourth container;
   a third thermal treatment system including a third heat exchanger operatively connected with the third container to heat and/or cool the walls of the third container;
   a fourth thermal treatment system including a fourth heat exchanger operatively connected with the fourth container to cool the walls of the fourth container;
   a suction device for taking in the second liquid or semi-liquid basic product and mixing the second liquid or semi-liquid basic product with air, comprising a tubular element including at least one lower opening for receiving the second liquid or semi-liquid basic product and at least one upper opening for receiving air, located in the third container and connected, in use, to the second connecting pipe, configured to allow mixing together the second liquid or semi-liquid basic product and air;
   a second dispensing device, connected to the fourth container to allow releasing the second liquid or semi-liquid product contained in the fourth container.

2. The machine according to claim 1, wherein the first container and the third container are defined by respective tanks which are openable at tops thereof.

3. The machine according to claim 1, wherein the second container and the fourth container are cylindrical.

4. The machine according to claim 1, wherein the pump is a gear pump.

5. The machine according to claim 4, wherein the pump comprises a first gear and a second gear acting in conjunction with each other.

6. The machine according to claim 1, wherein the suction device also comprises an adjustment element for adjusting an outflow cross section of the at least one lower opening and, in use, is coupled to the tubular element.

7. The machine according to claim 6, wherein the adjustment element is keyed to the tubular element, coupled to an outside wall of the tubular element.

8. The machine according to claim 7, wherein the adjustment element is configured to be positioned at a plurality of positions relative to the tubular element, to adjust the outflow cross section area of the at least one lower opening and thus adjust a ratio between the air and the second liquid or semi-liquid basic product transferred to the fourth container.

9. A method for making a first liquid or semi-liquid ice cream product and a second liquid or semi-liquid yogurt product, comprising the following steps:
   providing a machine comprising:
      a first container adapted to contain a first liquid or semi-liquid basic product;
      a first stirrer, mounted inside the first container;
      a second container connected to the first container to receive from the first container the first liquid or semi-liquid basic product;
      a first connecting pipe connecting the first container to the second container;
      a second stirrer, mounted inside the second container;
      a first thermal treatment system including a first heat exchanger operatively connected with the first container to heat and/or cool the walls of the first container;
      a second thermal treatment system including a second heat exchanger operatively connected with the second container to heat and/or cool the walls of the second container in such a way as to make a first liquid or semi-liquid product;
      a pump, including a first inlet duct, connected to the first container in order to draw the first liquid or semi-liquid basic product, a second, air inlet duct, and an outlet connected to the first connecting pipe, the pump being also configured to mix the first liquid or semi-liquid basic product with air by compression;
      a first dispensing device, connected to the second container to allow releasing the first liquid or semi-liquid product contained in the second container;
      a third container adapted to contain a second liquid or semi-liquid basic product;

a fourth container connected to the third container to receive therefrom the second liquid or semi-liquid basic product;

a second connecting pipe connecting the third container to the fourth container;

a third thermal treatment system including a third heat exchanger operatively connected with the third container to heat and/or cool the walls of the third container;

a fourth thermal treatment system including a fourth heat exchanger operatively connected with the fourth container to cool the walls of the fourth container;

a suction device for taking in the second liquid or semi-liquid basic product and mixing the second liquid or semi-liquid basic product with air, comprising a tubular element including at least one lower opening for receiving the second liquid or semi-liquid basic product and at least one upper opening for receiving air, located in the third container and connected, in use, to the second connecting pipe, configured to allow mixing together the second liquid or semi-liquid basic product and air;

a second dispensing device, connected to the fourth container to allow releasing the second liquid or semi-liquid product contained in the fourth container. preparing a first liquid basic product inside the first container;

subjecting the first liquid basic product to stirring and thermal treatment simultaneously inside the first container;

drawing the first liquid basic product with the pump and mixing the first liquid basic product with air;

increasing a pressure of the first liquid basic product with the pump and transferring the first liquid basic product into the second container;

mixing the first liquid basic product in the second container and subjecting the first liquid basic product to thermal treatment to make an ice cream finished product;

preparing a second liquid basic product inside the third container;

subjecting the second liquid basic product to stirring and thermal treatment simultaneously inside the third container;

transferring the second liquid basic product with the suction device from the third container to the fourth container and simultaneously mixing the second liquid basic product with air;

mixing the second liquid basic product in the fourth container and subjecting the second liquid basic product to thermal treatment to make a yogurt finished product.

10. The method according to claim 9, wherein the step of transferring the second liquid basic product with the suction device from the third container to the fourth container and simultaneously mixing the second liquid basic product with air comprises a step of adjusting an outflow cross section area of the at least one lower opening to adjust and thereby set a ratio between the air and the second liquid basic product inside the tubular element.

11. The method according to claim 10, wherein the steps of:

mixing the second liquid basic product in the fourth container and subjecting the second liquid basic product to thermal treatment to make a yogurt finished product; and mixing the first liquid basic product in the second container and subjecting the first liquid basic product to thermal treatment to make an ice cream finished product, are carried out simultaneously.

* * * * *